United States Patent
Reineke et al.

(10) Patent No.: US 12,143,281 B2
(45) Date of Patent: Nov. 12, 2024

(54) OBJECTIVE PROCESS UPDATE: CONTINUOUS REMOTE ENVIRONMENT ASSESSMENT

(71) Applicant: EMC IP Holding Company LLC, Hopkinton, MA (US)

(72) Inventors: Nicole Reineke, Northborough, MA (US); Robert A. Lincourt, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/304,812

(22) Filed: Jun. 25, 2021

(65) Prior Publication Data

US 2022/0417114 A1    Dec. 29, 2022

(51) Int. Cl.
*H04L 41/5019* (2022.01)
*H04L 41/5006* (2022.01)
*H04L 41/5009* (2022.01)
*H04L 43/55* (2022.01)

(52) U.S. Cl.
CPC ...... *H04L 41/5009* (2013.01); *H04L 41/5006* (2013.01); *H04L 41/5019* (2013.01); *H04L 43/55* (2022.05)

(58) Field of Classification Search
CPC . H04L 41/5009; H04L 41/5006; H04L 41/55; H04L 41/5019; H04L 43/55
See application file for complete search history.

(56) References Cited

U.S. PATENT DOCUMENTS

| | | | |
|---|---|---|---|
| 11,985,544 B2* | 5/2024 | Narasimha | H04W 88/085 |
| 11,985,658 B2* | 5/2024 | Miao | H04L 5/0023 |
| 11,985,670 B2* | 5/2024 | Panteleev | H04W 72/23 |
| 11,991,111 B2* | 5/2024 | Mondal | H04W 72/044 |
| 11,997,049 B2* | 5/2024 | Yu | H04L 5/0053 |
| 11,997,512 B2* | 5/2024 | Li | H04B 17/29 |
| 12,004,111 B2* | 6/2024 | Shan | H04W 4/40 |
| 12,010,734 B2* | 6/2024 | Sosnin | H04W 72/0453 |
| 12,028,867 B2* | 7/2024 | Li | H04L 1/1812 |
| 12,034,531 B2* | 7/2024 | Wei | H04L 5/0083 |
| 12,035,159 B2* | 7/2024 | Cui | H04W 56/0045 |
| 2005/0221268 A1* | 10/2005 | Chaar | G09B 7/02 434/350 |
| 2014/0310401 A1* | 10/2014 | Thomas | H04L 47/70 709/224 |
| 2015/0302336 A1* | 10/2015 | Dhingra | G06Q 10/06393 705/7.39 |
| 2019/0205887 A1* | 7/2019 | Kimmel | G06Q 20/3224 |

FOREIGN PATENT DOCUMENTS

CA    3032173 C * 5/2023  ............. G06Q 20/02

OTHER PUBLICATIONS

"Service Level Agreement—While You Work from Home". FindMeTechie.com website, May 22, 2020 [retrieved on Dec. 31, 2021]. Retrieved from the Internet: <URL: https://www.findmetechie.com/service-level-agreement-while-you-work-from-home>. (Year: 2020).*

* cited by examiner

Primary Examiner — Khanh Q Dinh
(74) Attorney, Agent, or Firm — Workman Nydegger (57) ABSTRACT

One example method includes assessing remote working environments. Conditions and characteristics or remote working environments are incorporated into service level agreements as indicators and objectives. This allows an entity to ensure that remote working environments meet certain standards.

18 Claims, 5 Drawing Sheets

OBJECTIVE PROCESS UPDATE: CONTINUOUS REMOTE ENVIRONMENT ASSESSMENT

FIELD OF THE INVENTION

Embodiments of the present invention generally relate to environment assessment and related applications. More particularly, at least some embodiments of the invention relate to systems, hardware, software, computer-readable media, and methods for environment assessment and remote worker environment assessment.

BACKGROUND

Service level agreements (SLAs) are generally viewed as agreements or contracts that relate to a service. SLAs are often used when something is offered or provided as a service (aaS). For example, a cloud provider in the business of providing storage, compute, or other services (e.g., SaaS, AIaaS, IaaS, BaaS, CaaS, PaaS) and clients needing those services often enter into an SLA. The parties to an SLA are often required to meet certain quantitative requirements (e.g., uptime, availability). The SLA includes information about the parties to the SLA and defines obligations regarding services and expectations, including the level of service expected by a client or customer from a provider or supplier.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to service level agreements (SLAs), and include creating SLAs, monitoring SLAs, enforcing SLAs, renewing SLAs, cancelling SLAs, assessing SLAs, and related operations. More particularly, at least some embodiments of the invention relate to systems, hardware, software, computer-readable media, and methods for considering, assessing, monitoring, improving, and/or managing worker or asset environments including in the context of SLAs.

In general, example embodiments of the invention allow environment data to be incorporated into or referenced by an SLA. Environment data may be used for service level indicators (SLIs), service level objectives (SLOs), or the like. Embodiments of the invention are disclosed with respect to remote workers and/or remote working environments. However, embodiments of the invention are not limited thereto and may be implemented in other situations where remote conditions or characteristics can be incorporated or referenced in an agreement or in other situations. Embodiments of the invention allow the conditions, characteristics, attributes, etc., of remote working environments to be used in the context of an SLA. This may ensure the working conditions meet a predetermined standard, improve employee health, improve company reputation, and the like.

Much research has been done on office conditions and factory conditions and their relationship to work quality and work quantity. It is well established that working conditions or environments impact the quality and quantity of work output. While an employer typically has some control over their place of business (e.g., office or factory environments), many workers are working in or are transitioning to different working environments including environments that may not be under the control of the employer. Many workers, for example, may work from home or a home office. In fact, remote work environments are becoming primary work environments for many workers or employees. However, an employer or other entity may not have any knowledge about the characteristics or conditions of the remote working environments of their workers. Further, an employer or other entity does not know how remote environments are impacting the reliability and quality of work output.

Embodiments of the invention help ensure that remote work environments meet certain standards by incorporating SLOs related to remote working conditions in an SLA. SLAs can be generated and applied to direct employees that work in remote environment and/or to the employees of an employer's vendors. For example, a company may be able to require and enforce certain factory standards for the entities that manufacture their goods regardless of location. In other words, a company has influence and some control over the working environments of their direct employees and/or the working environments of their vendor's workers. Embodiments of the invention allow a company or other entity to require certain environmental standards in working environments including home or other remote environments.

There are many reasons to establish the ability to measure characteristics of remote environments. As previously indicated, outputs are at higher risk of error due to poor environmental working conditions. In addition, requiring minimal conditions can reduce exposure against forced or abused labor claims should worker conditions be insufficient or inadequate. Assessing environmental conditions for remote environments and ensuring adequate working environments using SLAs can improve workforce health, decrease error and burnout, and increase the opportunity for diversity.

Embodiments of the invention use SLIs that relate to remote environment conditions or characteristics to generate SLOs in the formation of more meaningful SLAs. In one example, SLIs are quantitative (objective or subjective) measurements of aspects or characteristics of the remote environment. The ability to monitor and assess working environments (e.g., ensure that the working environment complies with relevant SLOs) using these SLIs can ensure that workers have satisfactory working environments. This improves work quality, work quantity, employee retention, and the like.

Figure 1:
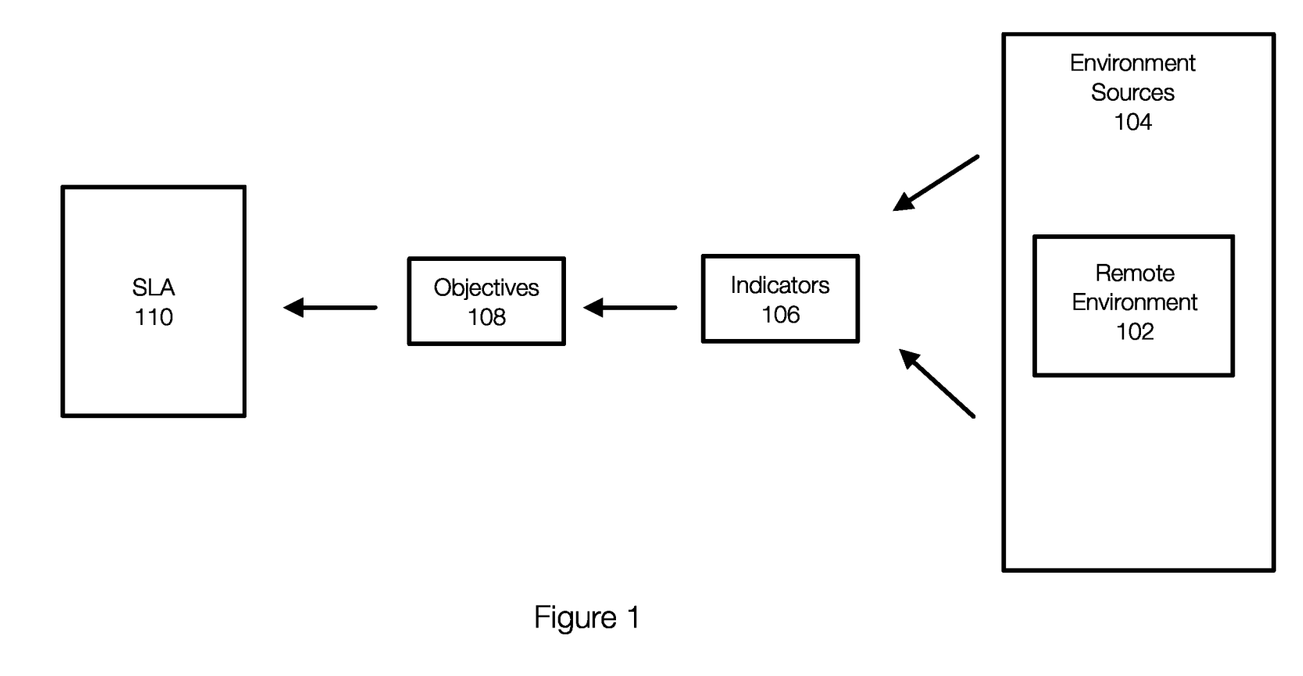
FIG. 1 discloses aspects of service level indicators associated with a working environment, service level objectives associated with the working environment, and a service level agreement that incorporates or references the environment-related service level objectives and indicators.

FIG. 1 discloses aspects of SLAs that may incorporate characteristics or information related to remote working environments. FIG. 1 illustrates an SLA 110 that includes objectives (SLOs) 108. The SLA 110 may represent an entire agreement and the objectives 108, by way of example only, may specify characteristics that can be measured or that relate to measurements including quantitative measurements. For example, availability, response time, throughput, and the like are examples of measurable characteristics. The objectives 108 may define expectations between a provider and a customer or between an employer and an employee or between an employer or entity and vendor (and the vendors employees).

The objectives 108 may be implemented or defined in a manner to help ensure that the working conditions or environment of workers (whether of the employer or entity directly or of vendors that provide services or goods to the employer or entity) are satisfactory. The objectives 108 can be configured to determine whether remote working conditions, for example, are equal to or similar to working conditions at the employer's place of business or at the employer's or vendor's factory, or whether the remote working conditions meet certain standards.

The objectives 108 may rely on or be associated with indicators (e.g., SLIs) 106. The indicators 106 may be specific measurements or specific data. For example, an SLA may include an objective stating that the room temperature of the remote environments should be within a defined range. More specifically, an objective may be to ensure that the remove working environment has a temperature or an average temperature in a range between 72 degrees to 78 degrees Fahrenheit. A temperature sensor may provide raw temperature data (an indicator). The indicator 106 can be used to determine whether the objective is achieved or satisfied.

More generally, an environment may be assessed by determining whether the objectives of the SLA are satisfied. Some objectives may relate to a specific indicator. Other objectives may relate to multiple indicators. An indicator may also be associated with multipole objectives.

In this example, the indicators 106 may relate to a remote environment 102 and may quantitatively measure or value various conditions or characteristics of the remote environment 102. The indicators 106 may be generated by or collected from environment sources 104. More specifically, data may be generated by and/or collected from the environment sources 104. The indicators 106 are the measurements, outputs, values, etc., of those sources. The indicators 106 include outputs such as sensor outputs. For example, a thermometer may generate temperature data. An indicator may be the temperature output by the thermometer at a particular time. The indicator is thus a measurement of the temperature in this example.

Other indicators may be derived from the environment sources 104. For example, a camera is an example of an environment source. The video data generated by the camera may be analyzed for certain indicators. For example, a worker's posture, facial expression, and the like may be determined from camera video data. The indicator may be the posture, the facial condition, the number of breaks, or the like.

The sources 104 may have different types. Different sensors, for example, output different data. The sources 104 can include sensors such as temperature sensors, carbon monoxide sensors, noise sensors, or other environmental sensors. The sources 104 may also include data collected from or generated by smart phones, smart body devices (e.g., smart watches), and the like. The sources may include cameras, microphones, and the like.

In addition, the sources 104 may encompass more than a worker's specific location. For example, a remote worker may be working at home or in a specific room of the home. The remote environment 102 may be defined as the specific room in which work is performed (other definitions are possible). The sources 104, however, may be related to the specific room, other rooms in the remote environment, the neighborhood, the city, websites (which may be quite remote from the environment 102), or the like or combination thereof. In general, data may be collected from and/or generated by sources that have relevance to assessing the remote environment 102.

Figure 2:
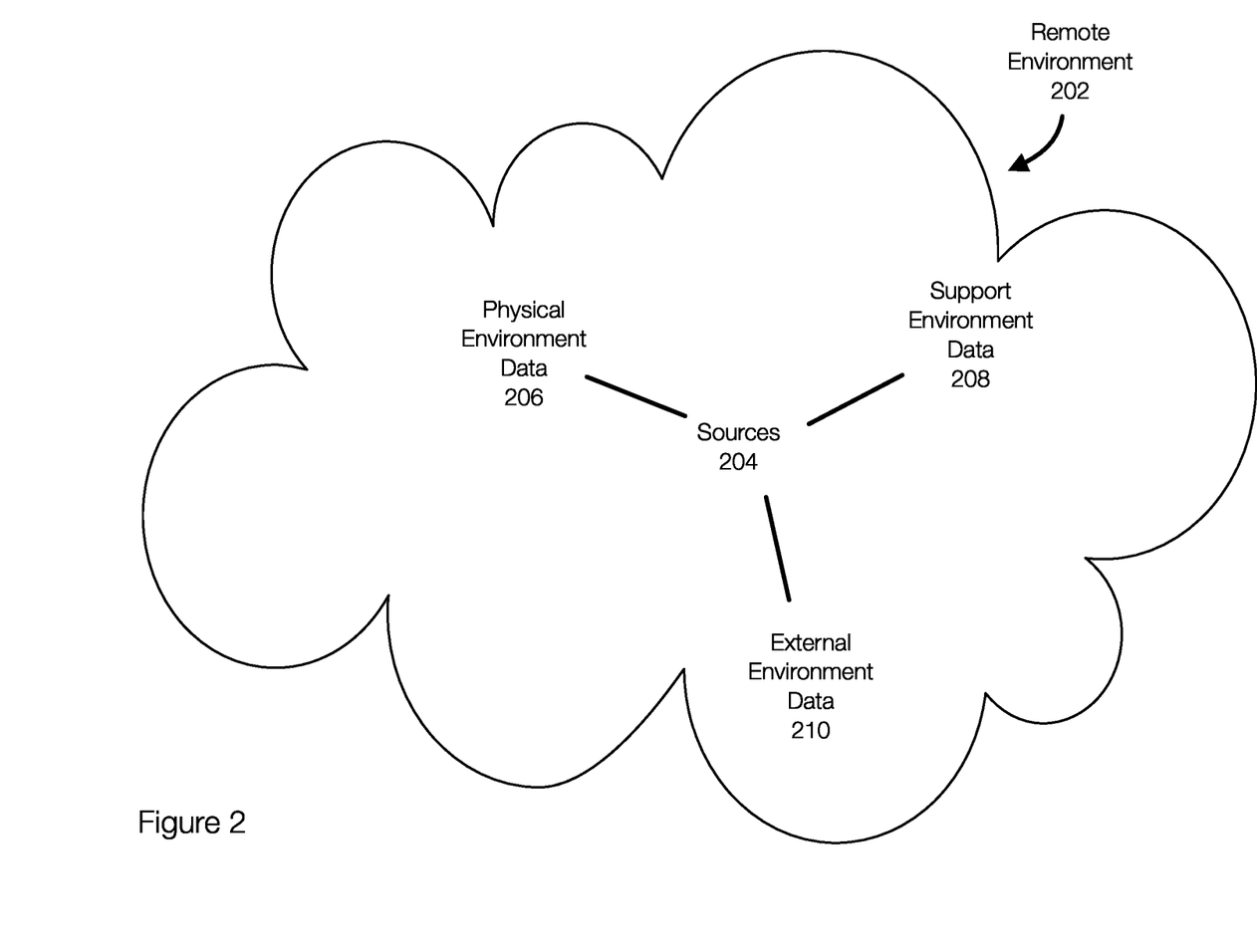
FIG. 2 discloses aspects of a remote environment and illustrates examples of data or sources used to assess the remote environment.

FIG. 2 discloses an example of a remote environment and illustrates examples of data or sources used to assess the remote environment. FIG. 2 illustrates a remote environment 202. As previously stated, the remote environment 202 can be defined in different ways including, by way of example, from a room, to a geographic area or location (e.g., a geofenced area), or the like. The sources used to evaluate the remote environment 202, however, may be inside the boundary and/or outside the boundary of the remote environment 202. FIG. 2 further illustrates data types and sources associated with assessing a remote environment and associated with service level indicators and objectives By way of example, a worker (or multiple workers) may work in the environment 202. The data sources from which data or indicators are collected may be local or in the same location as the remote environment 202. However, some sources may be remote from the environment 202.

The sources 204 may have different types including, but not limited to, physical environment data 206, support environment data 208, and external environment data 210. The physical environment data 206 may represent physical aspects of the location of the remote environment 202. This physical environment sources may include sensors or other sources that generate data measuring, by way of example only, connectivity, air quality, noise levels, temperature, humidity, heart rate, posture, down time, and the like. In addition to sensors that may, for example, be in the vicinity (e.g., room) of the worker, data such as air quality may be obtained from other companies that may offer ambient environment measurements (e.g., Google Earth Outreach). This may allow information to be collected to determine whether internal remote office readings are in line with local environment readings. Different sources of data may measure the same or similar aspect or characteristic of or related to the remote environment 202. This may allow for more objective measurements and allow the measurements to be performed or determined with regard to local standards.

The support environment data 208 may relate to various regulations (e.g., Occupational Safety and Health Administration or OSHA). The support environment 208 data may relate to information describing whether a worker has the tools and processes to perform their job.

The support environment data 208 may include objective data and subjective data. Objective data may include things that can be objectively measured. For example, whether a worker has a laptop or computer suitable for their job requirements or has sufficient connectivity can be determined. The qualities or capabilities of the worker's equipment and connectivity can be objectively measured via software. This may allow a determination to be made regarding whether an objective of the SLA that defines adequate hardware requirements has been achieved based on measured hardware characteristics (indicators).

The support environment data 208 may also be subjective. Subjective support environment data 208 may relate to how a worker or employee feels about their job or environment. By way of example, subjective support environment data may be collected via surveys. Subjective support environment data may also be collected from sources such as employer evaluation websites (e.g., glassdoor.com), which are not employer owned or controlled, where employees may be able to express themselves more freely than in an employer provided survey. Information determined from subjective support environment data 202 may help an employer understand how their employees feel and may be used to determine whether an objective related to employee satisfaction is achieved. For example, information from employer evaluation websites may be categorized, analyzed, ranked, or the like. The objective of the SLA may require or encourage a ranking, which may be based on a predetermined method, in a certain range. An objective may be to have 90% worker satisfaction with their remote environment and the subjective support environment data 208 (e.g., employer surveys, anonymous or $3^{rd}$ party websites) can be processed and assigned a value that can be compared with the objective.

The external environment data 210 may include objective measurements or data. The external environment data 210 may relate to more than the specific or immediate location of the worker and may encompass the neighborhood surrounding the remote worker. Thus, air quality, noise quality, open spaces, infrastructure, and the like can be objectively measured. This category of data can place the personal environment of the worker in perspective. This category of data may also be used to deploy resources for the improvement of working conditions based on detected or measured conditions.

The external environment data 210 may also be subjective. Time-boxed events (e.g., protests, weather, earthquake) and longer events (pandemic, power outage, government problems) can impact a remote working environment and the external environment data 210 can be used in different ways.

Data from the sources 204 can be collected periodically, repeatedly, on demand, contractually, or the like. Embodiments of the invention allow measurements of remote worker environment characteristics or conditions to be incorporated as objectives in an SLA. This allows SLAs to be renewed or cancelled, based in part on remote working conditions. In addition, a company's reputation can be enhanced based on transparently improving or ensuring working conditions, including for remote workers.

Employers can request their employees comply (or help them comply by providing needed resources) with workplace best practices and allow remote devices to measure compliance. For example, cameras can be used to measure or report on posture, frequency of rest breaks. This data may also be used for generating safe practices, encouraging compliance using a rewards system, responding to workplace violations, or the like.

Figure 3:
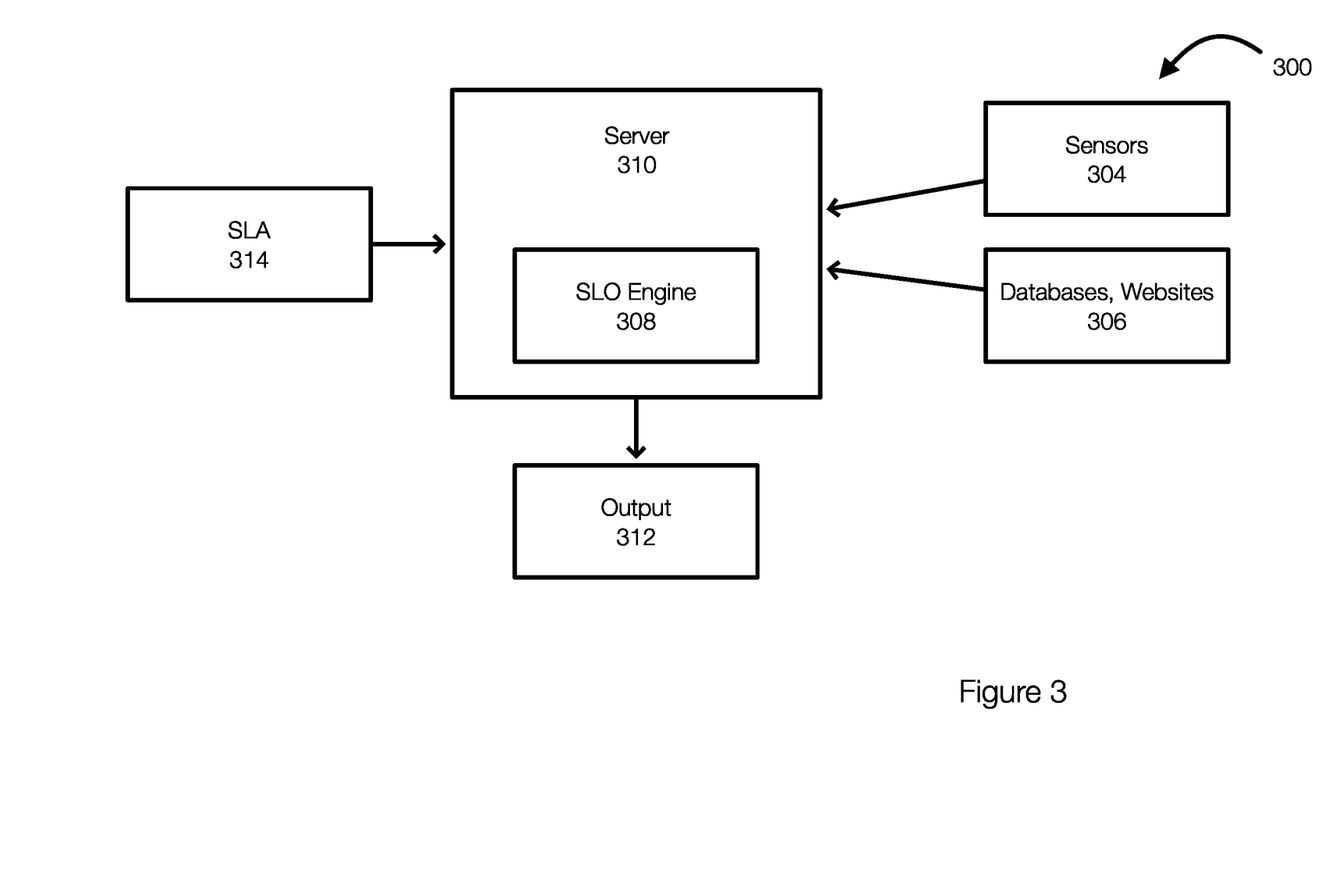
FIG. 3 discloses aspects of monitoring remote environments.

FIG. 3 discloses aspects of ensuring or assessing remote workplace conditions. FIG. 3 illustrates a server, such as a cloud-based server or cluster, that is configured to receive indicators or data from sources associated with remote work environments. As illustrated, the server 310 may be configured to receive data from sensors 304. The sensors 304 may be physically present in the immediate environment of the worker (e.g., room), attached or integrated into the worker's equipment (e.g., computer), worn by the worker, or the like. The sensors 304 may also be associated with the neighborhood or larger area (e.g., worker's building, neighborhood, or the like).

The indicators received by the server 310 may also come from databases or websites 306. The server 310 may be associated with spiders or crawlers that are configured to retrieve information that may be relevant to the remote working conditions. For example, the server 310 may have or use application programming interfaces (APIs) to access various websites or databases such as weather databases, power outage-based websites, fire prediction websites, employer information websites, or the like.

The indicators from the sources 300 may be inputs into an SLO engine 308. The SLO engine 308 may be implemented using physical machines, virtual machines, containers, or the like. The SLO engine 308 may receive inputs from the sources 300. The engine 308 may also receive inputs such as an SLA 314. The input from the sources 300 can be used by the engine 308 to determine whether the environment associated with the sources 300 complies with the objectives of the SLA 314. The engine 308 or the server 310 may generate an output 312. The output 312 may determine whether the remote working environment complies with the relevant SLOs of the relevant SLA 314.

The compliance or non-compliance may lead an employer or other entity to take actions. The employer may be able to ensure that non-compliant remote working conditions improve because the remote working conditions are part of an SLA. An employer may devote resources, for example, to improving remote working conditions. An employer may use the output to encourage vendors to improve conditions for the vendor's employees.

For example, an employer can hold external vendors accountable to ensure that the noise level does not exceed a threshold decibel level over a period of time or ensure that the air quality does not exceed a specific particle per unit of air quality over a period of time. Embodiments of the invention can operate independently of who or what provides the data points. For example, the sources 300 may not be associated with an employer or the worker. Further, an independent third party could implement an SLO engine and generate reports for the parties to the SLA.

Ensuring or monitoring remote working environments may be provided as a service. A service provider and/or their clients may subscribe to an environment assessment service or remote conditions as a service (RCaaS). In one example, a vendor or manufacturer of computers and related software could use information obtained via use of those computers in providing such a service. For example, a computer may have various hardware sensors (camera, microphone, thermometer) and software implemented sensors capable of collecting data. The computer may also be able to communicate or interface with other local sensors, including sensors worn by the user (e.g., smart watch, heart rate monitor, thermostat, carbon monoxide detector). This information or indicators collected by or accessible by the computer can be used in environment assessment. Further, embodiments of the invention can also enforce SLAs in situations where the indicators are not provided or are absent. When providing RCaaS, a provider may be configured with an SLO engine. Remote workers can register with the service and the service can generate outputs that can be used to assess compliance with SLAs. If the objectives of the SLA are also input to the SLO engine, the output may indicate compliance or non-compliance. Thus, the service may provide information regarding how well a remote environment complies with relevant regulations, information on working environments, time based series information on working conditions, or the like.

In one example, remote conditions may be evaluated prior to engaging in an SLA. This may influence the terms of the SLA, provide an incentive to improve conditions, provide a baseline with which to measure improvements, or the like.

Indicators and objectives can be used to create rules that trigger events or notifications when deviations in working conditions and/or working output from defined or acceptable conditions are detected. It is also possible to provide resources where the quality and conditions of the working environment do not meet applicable standards. In other words, a company may deploy resources to improve working conditions at locations that need improvement. Working assignments can be redirected from remote workers and assets that do not meet minimal standards. Workloads, for example, may be directed away from areas of high pollution or from workers that are experiencing an event such as an environmental issue (e.g., earthquake, fire).

Figure 4:
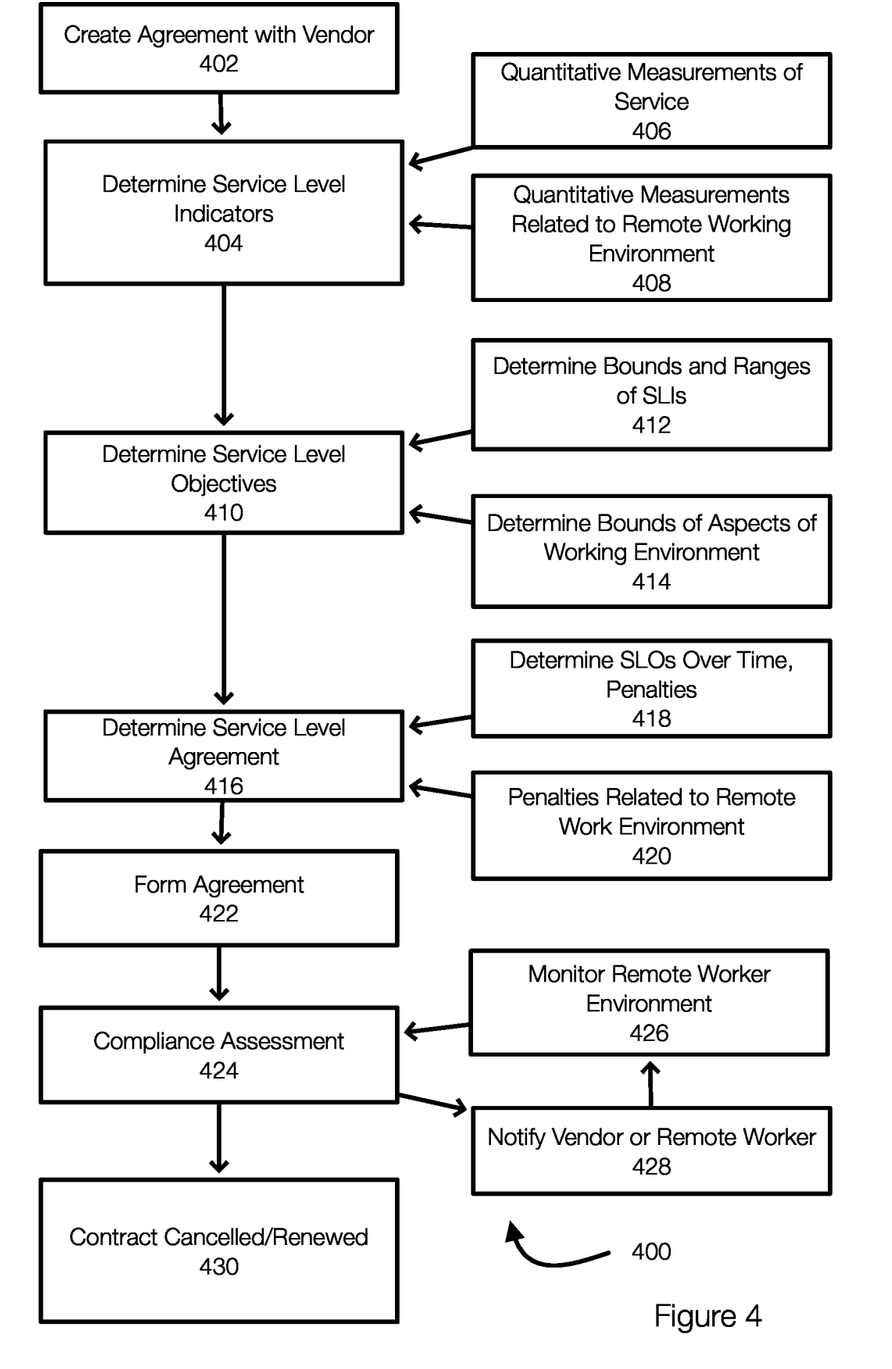
FIG. 4 discloses aspects of forming a service level agreement, enforcing a service level agreement, renewing a service level agreement and/or cancelling a service level agreement.

FIG. 4 discloses aspects of a method related to, for example, SLAs and remote environments or remote working environments or conditions. Various aspects of the method 400 may be performed independently, in succession, repeatedly, or the like.

In one example, an agreement is created 402 with a vendor (or other entity including an employee). FIG. 4 may include aspects of creating an SLA, enforcing an SLA, monitoring/assessing remote working environments, or the like. As part of this process 400, indicators are determined 404. The indicators may include or relate to quantitative measurements of service 406 and/or quantitative measurements related to the remote working environment 408. These indicators may be of different types such as physical environment data, supporting environment data, and/or external environment data.

Next, service level objectives are determined 410. This may include determining 412 acceptable bounds and ranges of the indicators, determining 414 bounds or aspects of the working environment. Next, the service level agreement, which incorporates the objectives, is determined 416. This may include determining 418 penalties related to some objectives and/or penalties related to the objectives for the remote work environment 420. Next, the agreement is formed 422.

Once the agreement is formed and in operation, a compliance assessment may be performed 424. The compliance assessment 424 may be performed periodically, over time, or the like. Some objectives, for example, may be evaluated based on averages or based on values over time. The compliance assessment 424 may include monitoring 426 the remote working environment. For example, data is collected (the indicators) from multiple sources and the objectives are evaluated based on the indicators. A vendor or remote worker may be notified 428 regarding the compliance assessment. This allows a vendor to take action, for example by addressing aspects related to objectives that were not satisfied. For example, if worker satisfaction is too low, or if the air quality is poor, actions can be taken to remediate these issues.

Over time and based on the compliance assessment 424, the contract can be cancelled or renewed 430.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, remote environment operations, SLA operations, and related operations.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients or servers (e.g., SLO engine) that are capable of collecting, modifying, and creating, data. As such, a particular client or server may employ, or otherwise be associated with, one or more instances of each of one or more applications that perform such operations with respect to data. Such clients may comprise physical machines, containers, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware.

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1. A method, comprising: receiving indicators related to a remote working environment, evaluating objectives of a service level agreement based on the indicators, assessing compliance with a service level agreement based on the objectives and/or the indicators, and performing an action based on the determined compliance.

Embodiment 2. The method of embodiment 1, wherein the indicators comprise data of different types including physical environment data, supporting environment data, and external environment data.

Embodiment 3. The method of embodiment 1 and/or 2, wherein the supporting environment data includes objective supporting environment data and/or subjective supporting environment data and wherein the external environment data includes objective external environment data and subjective external environment data.

Embodiment 4. The method of embodiment 1, 2, and/or 3, wherein physical environment data includes at least data related to connectivity, air, noise, physiological data, ambient environment data, wherein supporting environment data includes at least regulation compliance, tools and processes related data, surveys, third party data, and wherein the external environment data includes at least data related to neighborhood air quality, noise quality, open spaces, and infrastructure.

Embodiment 5. The method of embodiment 1, 2, 3, and/or 4, wherein performing an action includes at least one of renewing the service level agreement, cancelling the service level agreement, improving the remote working environment based on the indicators.

Embodiment 6. The method of embodiment 1, 2, 3, 4, and/or 5, wherein sources of the indicator include sensors, computing equipment, worn sensors, websites, cameras, workplace assets, microphones, databases, or combination thereof.

Embodiment 7. The method of embodiment 1, 2, 3, 4, 5, and/or 6, further comprising determining the indicators and objectives related to the remote working environment to include in the service level agreement and determining penalties associated with the objectives.

Embodiment 8. The method of embodiment 1, 2, 3, 4, 5, 6, and/or 7, further comprising assessing the indicators prior to forming the service level agreement.

Embodiment 9. The method of embodiment 1, 2, 3, 4, 5, 6, 7, and/or 8, wherein each indicator is associated with at least one objective.

Embodiment 10. The method of embodiment 1, 2, 3, 4, 5, 6, 7, 8, and/or 9, further comprising generating safe practices, encouraging compliance using a rewards system, responding to workplace violations, or the like.

Embodiment 11. A remote compliance service comprising an engine implemented in a computing environment and configured to perform the method of embodiment 1, 2, 3, 4, 5, 6, 7, 8, 9, and/or 10.

Embodiment 12. A method for performing any of the operations, methods, or processes, or any portion of any of these or any combination thereof, disclosed herein.

Embodiment 13. A non-transitory storage medium having stored therein instructions that are executable by one or more hardware processors to perform operations comprising the operations of any one or more of embodiments 1 through 12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
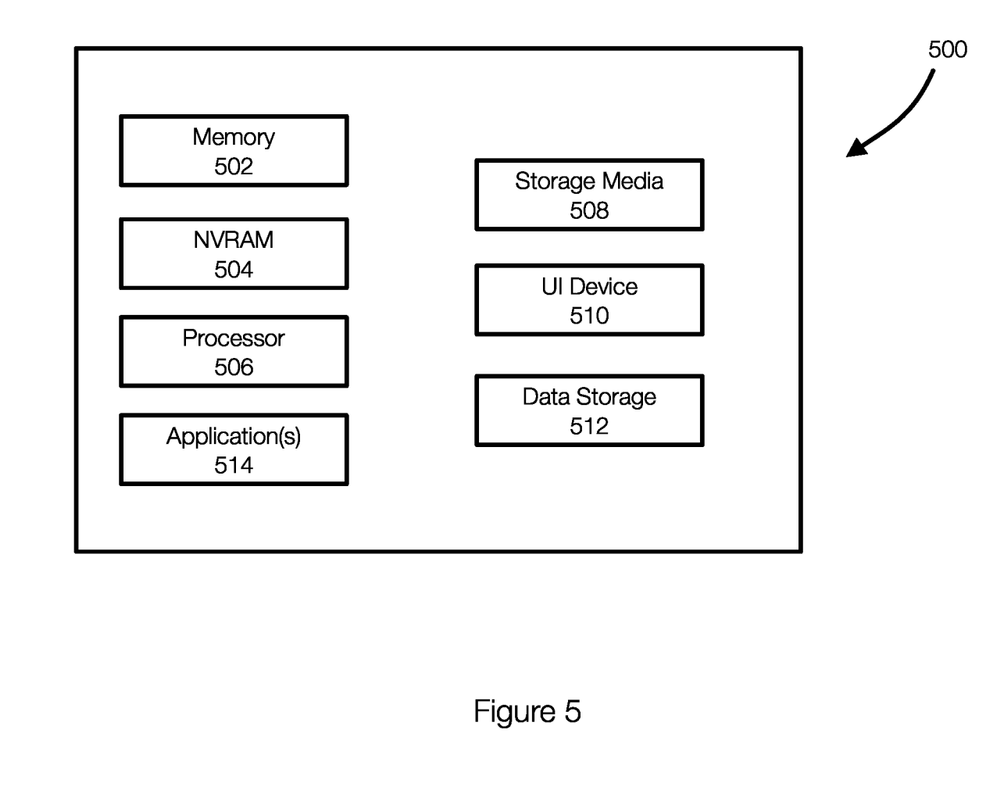
FIG. 5 discloses aspects of a computing system or a computing device.

With reference briefly now to FIG. 5, any one or more of the entities disclosed, or implied, herein may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for ensuring conditions associated with a employer environment are provided in a remote working computing environment that is associated with a user, the method comprising:
receiving indicators related to conditions of the remote working computing environment at a server, wherein the indicators are transmitted to the server from the remote working computing environment, the indicators including physical environment data, supporting environment data, wherein the physical environment data includes data collected from sensors, wherein the supporting environment data relates at least to regulation compliance and includes data related to capabilities of computing equipment associated with the user that is collected from the computing equipment, wherein the external environment data includes data relating to an environment outside of an immediate location of a remote worker, wherein the external environment data is collected from at least databases and websites;
inputting the indicators and objectives of a service level agreement into a service level objectives (SLO) engine operating in the server, wherein the objectives relate to conditions provided in the employer environment, wherein the SLO engine generates an output by comparing dicators with the objectives and the output indicates whether the indicators satisfy the objectives;
assessing compliance of the remote working computing environment with the objectives periodically based on the output of the SLO engine; and
performing an action based on the determined compliance, wherein the action includes changing the conditions of the remote working computing environment by improving at least one of a physical condition of the remote working computing environment or tools or connectivity associated with the user based on the determined compliance.

2. The method of claim 1, wherein the supporting environment data includes objective supporting environment data and/or subjective supporting environment data and wherein the external environment data includes objective external environment data and subjective external environment data.

3. The method of claim 1, wherein physical environment data includes at least data related to connectivity, air, noise, physiological data, ambient environment data, wherein supporting environment data includes at least regulation compliance, tools and processes related data, surveys, third party data, and wherein the external environment data includes at least data related to neighborhood air quality, noise quality, open spaces, and infrastructure.

4. The method of claim 1, wherein performing an action includes at least one of renewing the service level agreement or cancelling the service level agreement.

5. The method of claim 1, wherein sources of the indicator include sensors, computing equipment, worn sensors, websites, cameras, workplace assets, microphones, databases, or combination thereof.

6. The method of claim 1, further comprising determining the indicators and objectives related to the remote working computing environment to include in the service level agreement and determining penalties associated with the objectives.

7. The method of claim 1, further comprising assessing the indicators prior to forming the service level agreement.

8. The method of claim 1, wherein each indicator is associated with at least one objective.

9. The method of claim 1, further comprising generating safe practices, encouraging compliance using a rewards system, and/or responding to workplace violations.

10. A remote compliance service comprising an engine implemented in a computing environment and configured to perform the method of claim 1.

11. A non-transitory storage medium having stored therein instructions that are executable by one or more hardware processors to perform operations for ensuring conditions associated with an employer environment are provided in a remote working computing environment that is associated with a user, the operations comprising:

receiving indicators related to conditions of the remote working computing environment at a server, wherein the indicators are transmitted to the server from the remote working computing environment, the indicators including physical environment data, supporting environment data, wherein the physical environment data includes data collected from sensors, wherein the supporting environment data relates at least to regulation compliance and includes data related to capabilities of computing equipment associated with the user that is collected from the computing equipment, wherein the external environment data includes data relating to an environment outside of an immediate location of a remote worker, wherein the external environment data is collected from at least databases and websites;

inputting the indicators and the objectives of a service level agreement into a service level objectives (SLO) engine operating in the server, wherein the objectives relate to conditions provided in the employer environment, wherein the SLO engine generates an output by comparing the indicators with the objectives and the output indicates whether the indicators satisfy the objectives;

assessing compliance of the remote working computing environment with the objectives periodically based on the output of the SLO engine; and performing an action based on the determined compliance, wherein the action includes changing the conditions of the remote working computing environment by improving at least one of a physical condition of the remote working computing environment or tools or connectivity associated with the user based on determined compliance.

12. The non-transitory storage medium of claim 11, wherein the supporting environment data includes objective supporting environment data and/or subjective supporting environment data and wherein the external environment data includes objective external environment data and subjective external environment data.

13. The non-transitory storage medium of claim 11, wherein physical environment data includes at least data related to connectivity, air, noise, physiological data, ambient environment data, wherein supporting environment data includes at least regulation compliance, tools and processes related data, surveys, third party data, and wherein the external environment data includes at least data related to neighborhood air quality, noise quality, open spaces, and infrastructure.

14. The non-transitory storage medium of claim 11, wherein performing an action includes at least one of renewing the service level agreement of, cancelling the service level agreement.

15. The non-transitory storage medium of claim 11, wherein sources of the indicator include sensors, computing equipment, worn sensors, websites, cameras, workplace assets, microphones, databases, or combination thereof.

16. The non-transitory storage medium of claim 11, further comprising determining the indicators and objectives related to the remote working computing environment to include in the service level agreement and determining penalties associated with the objectives.

17. The non-transitory storage medium of claim 11, further comprising assessing the indicators prior to forming the service level agreement, wherein each indicator is associated with at least one objective.

18. The non-transitory storage medium of claim 11, further comprising generating safe practices, encouraging compliance using a rewards system, and/or responding to workplace violations.

* * * * *